Patented Dec. 11, 1934

1,983,949

UNITED STATES PATENT OFFICE 1,983,949

METHOD OF POLYMERIZING VINYL CHLORIDE

Waldo L. Semon, Cuyahoga Falls, Ohio, assignor to The B. F. Goodrich Company, New York, N. Y., a corporation of New York No Drawing. Application March 27, 1931, Serial No. 525,881

12 Claims. (Cl. 260—2)

This invention relates to the polymerization of unsaturated organic substances, and particularly to the polymerization of vinyl chloride.

It has been known for some time that vinyl chloride polymerizes readily under the influence of light and heat, particularly in the presence of catalysts. The polymerized product has been used for the production of molded goods, coating compositions, flexible photographic films, etc. For many of these uses a soluble product of intermediate molecular weight is preferred or is suitable, but certain other uses require a high polymer, of high molecular weight, and insoluble in practically all known solvents at room temperatures. The chief object of this invention, then, is to provide a new method for polymerizing vinyl chloride, and particularly for producing the insoluble or so-called gamma vinyl chloride as distinguished from the soluble alpha or beta forms.

This invention is characterized by the fact that the polymerization of the vinyl chloride is carried out in the presence of a mixture of two different catalysts, one of which is an oxidizing substance, while the other is a substance which possesses the property of polymerizing more readily than vinyl chloride. For example the oxidizing catalyst may be hydrogen peroxide, ozone, barium peroxide, benzoyl peroxide, or a metal compound which acts as an oxidizing agent in the presence of oxygen, such as uranium nitrate, salts of lead, mercury, copper, etc. The second, polymerizable catalyst may be an unsaturated hydrocarbon such as butadiene or a hydrocarbon derivative such as unsymmetrical dichlorethylene, or an aldehyde such as formaldehyde or acrolein. Alternately the polymerizable substance may be added in the form of a compound which readily decomposes or dissociates and liberates one of the foregoing polymerizable substances. In either case the active material present during the reaction is the same.

This invention is preferably carried out by heating the mixture of substances described above, either alone or in the presence of a suitable solvent, until the vinyl chloride is sufficiently polymerized. Light may be used if desired to stimulate the reaction, but the apparatus required is costly and fragile, the time required is very long, and since no appreciable advantage is secured, the reaction is ordinarily carried out in the absence of light. In pressure equipment in the absence of light. In this respect the process of this invention differs from all those heretofore described, for the hard, insoluble, gamma vinyl chloride was not obtainable by the previously known methods except by actinic polymerization, that is, by the use of light.

The gamma vinyl chloride is not only hard and insoluble, but is exceedingly tough and therefore very difficult to reduce to a finely divided condition. Since it is essential for certain uses that the product be in the form of a more or less finely divided powder, it is frequently preferred to carry out the polymerization reaction in such a manner that the product is formed directly in a finely divided condition. This is effected by adding a solvent in which the unpolymerized vinyl chloride is soluble but in which the polymerized product is completely insoluble, so that it precipitates from the solution as fast as it is formed. Suitable solvents for this purpose are methyl or ethyl alcohol, or gasoline. Solvents in which polymerized or partially polymerized vinyl chloride is soluble, such as acetone, ethylene dichloride, chlorbenzene, etc. are unsuitable for this purpose because the polymerized vinyl chloride does not precipitate, but gradually thickens to a gel which is difficult to dry completely, and is not susceptible to fine grinding. Nevertheless, it is not intended to exclude such solvents from the broad scope of the invention.

*Example 1.*—As a specific example of one embodiment of the method of this invention, 100 parts by weight of vinyl chloride, together with 0.75 parts by weight of trioxymethylene and 0.3 parts by weight of benzoyl peroxide, are heated in an iron autoclave for two hours at 100° C. The trioxymethylene decomposes when heated, liberating formaldehyde, which is apparently the active catalyst. A hard, tough, insoluble product is obtained.

*Example 2.*—100 parts by weight of vinyl chloride, 5 parts of unsymmetrical dichlorethylene, and 1 part of uranium nitrate are heated for two hours at 100° C. The product is similar to that of Example 1 above.

*Example 3.*—100 parts by weight of vinyl chloride, 5 parts of trichlorethane, and 0.4 parts of benzoyl peroxide are heated for two hours at 100° C. The trichlorethane liberates dichlorethylene when heated. The product is substantially identical with that of Example 2 above.

*Example 4.*—100 parts by weight of vinyl chloride are mixed with 5 parts of unsymmetrical dichlorethylene, ½ part of benzoyl peroxide, and 200 parts of methyl alcohol. The solution is heated in an iron autoclave for two hours at 100° C. The product is filtered to separate the finely divided polymerized vinyl chloride from the solvent, which may be used over again.

The products secured by the above described process are insoluble in all common solvents at room temperature and can be dissolved in appropriate solvents only at relatively high temperatures. For example, they may be dissolved in from one to four times their weight of nitro diphenylether, benzyl benzoate, etc. at 180° C. These solutions congeal upon cooling to tough rubber-like masses as disclosed and claimed in my copending application, Serial No. 320,003, filed November 16, 1928, now Patent No. 1,929,453 of Oct. 10, 1933.

While I have herein disclosed with considerable particularity certain preferred manners of performing my invention, I do not thereby desire or intend to limit myself solely thereto, for, as hitherto stated, the procedure may be modified, the precise proportions of the materials utilized may be varied, and other materials having equivalent properties may be employed if desired without departing from the spirit and scope of the invention as defined in the appended claims.

I claim:

1. The process of polymerizing vinyl chloride which comprises treating vinyl chloride with small proportions of an oxidizing catalyst of polymerization and of a compound selected from the group consisting of formaldehyde, acrolein, unsymmetrical dichlorethylene, trichlorethane and butadiene.

2. The process of polymerizing vinyl chloride which comprises heating vinyl chloride in the presence of small proportions of an oxidizing catalyst of polymerization and of a compound selected from the group consisting of formaldehyde, acrolein, unsymmetrical dichlorethylene, trichlorethane and butadiene.

3. The process of polymerizing vinyl chloride which comprises heating a solution of vinyl chloride in a solvent in which polymerized vinyl chloride is insoluble, in the presence of small proportions of an oxidizing catalyst of polymerization and of a compound selected from the group consisting of formaldehyde, acrolein, unsymmetrical dichlorethylene, trichlorethane and butadiene.

4. The process of polymerizing vinyl chloride which comprises heating vinyl chloride in the presence of small proportions of a peroxide and of a compound selected from the group consisting of formaldehyde, acrolein, unsymmetrical dichlorethylene, trichlorethane and butadiene.

5. The process of polymerizing vinyl chloride which comprises heating vinyl chloride in the presence of small proportions of an organic peroxide and of a compound selected from the group consisting of formaldehyde, acrolein, unsymmetrical dichlorethylene, trichlorethane and butadiene.

6. The process of polymerizing vinyl chloride which comprises adding trichlorethane and an oxidizing catalyst of polymerization to vinyl chloride and heating the mixture.

7. The process of polymerizing vinyl chloride which comprises adding small proportions of trichlorethane and an organic peroxide to vinyl chloride and heating the mixture.

8. The process of polymerizing vinyl chloride which comprises heating a solution of vinyl chloride in a solvent in which polymerized vinyl chloride is insoluble, in the presence of small proportions of unsymmetrical dichlorethylene and an organic peroxide.

9. The process of polymerizing vinyl chloride which comprises heating vinyl chloride in the presence of small proportions of formaldehyde and an oxidizing catalyst of polymerization.

10. The process of polymerizing vinyl chloride which comprises heating vinyl chloride in the presence of small proportions of formaldehyde and an organic peroxide.

11. The process of polymerizing vinyl chloride which comprises heating a solution of vinyl chloride in a solvent in which polymerized vinyl chloride is insoluble in the presence of small proportions of formaldehyde and an organic peroxide.

12. The process of polymerizing vinyl chloride which comprises dissolving vinyl chloride in a volatile alcohol together with small proportions of an oxidizing catalyst of polymerization and of a compound which polymerizes more readily than vinyl chloride, heating the solution, and separating the insoluble polymerized vinyl chloride from the solvent.

WALDO L. SEMON.